Sept. 6, 1960     D. R. YARNALL ET AL     2,951,496
STEAM TRAP
Filed Feb. 11, 1958     7 Sheets-Sheet 1
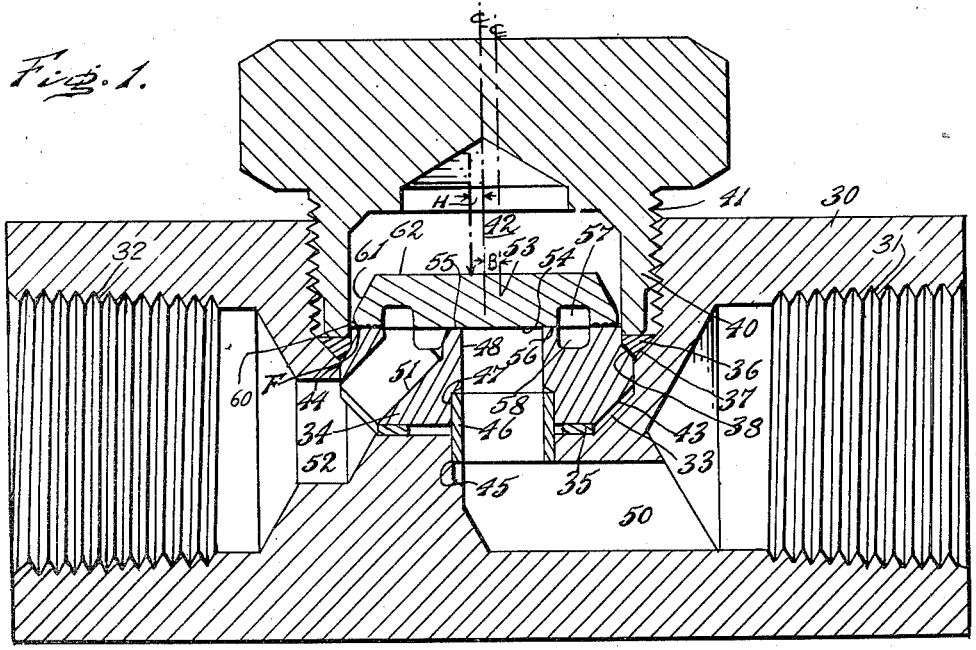
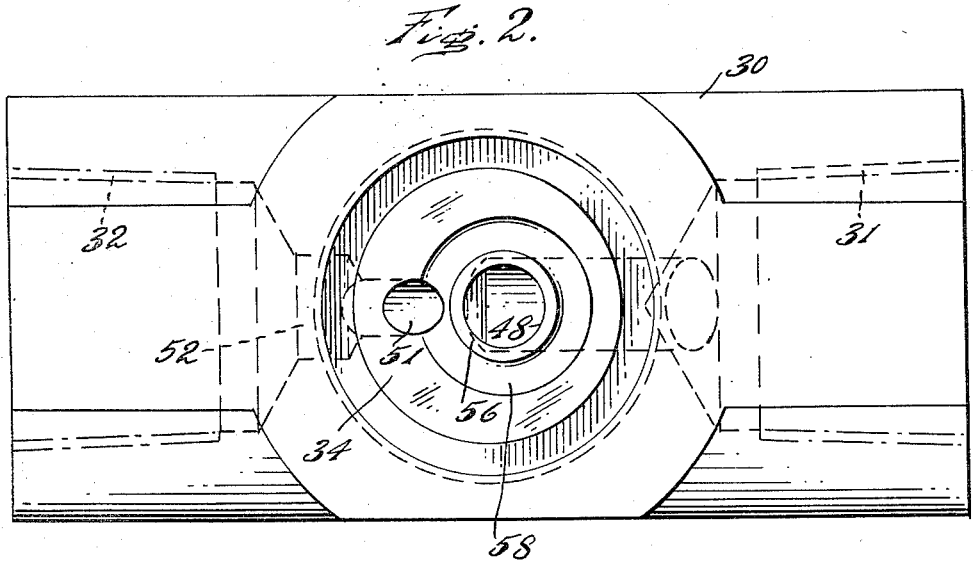
INVENTORS
David Robert Yarnall
Walter J. Hinderman
BY
ATTORNEYS INVENTORS
David Robert Yarnall
Walter J. Kinderman
BY
ATTORNEYS.

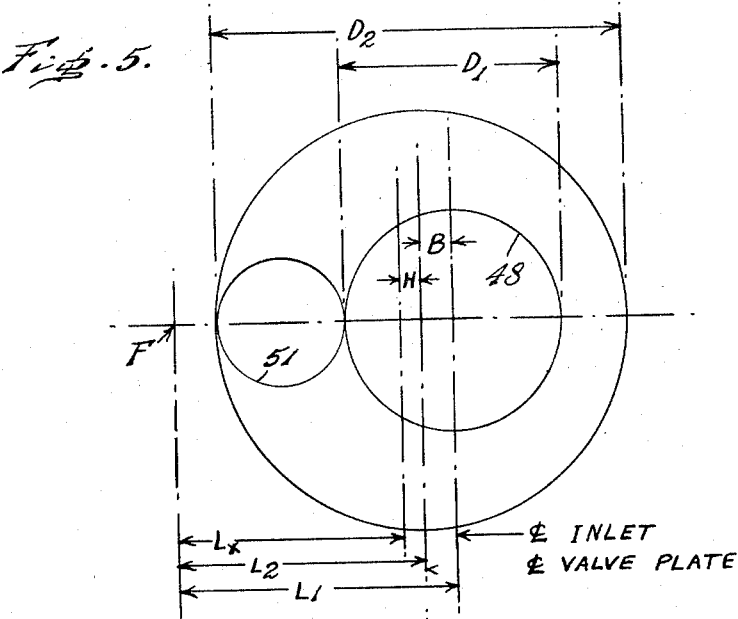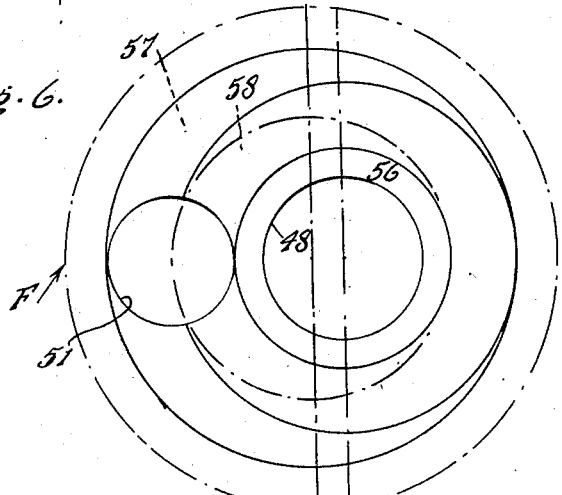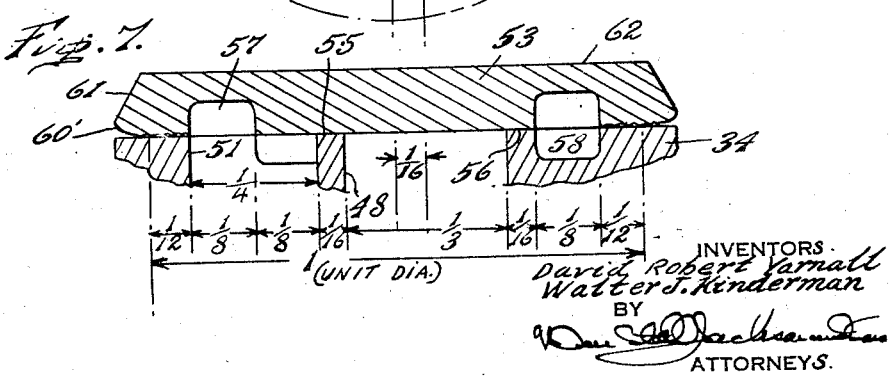

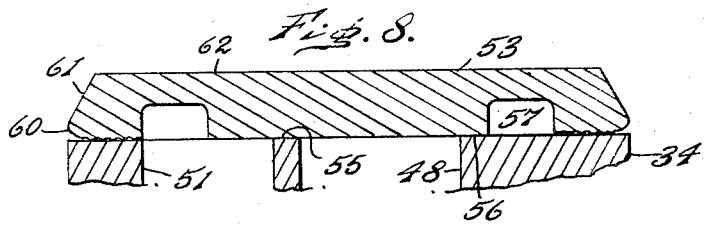
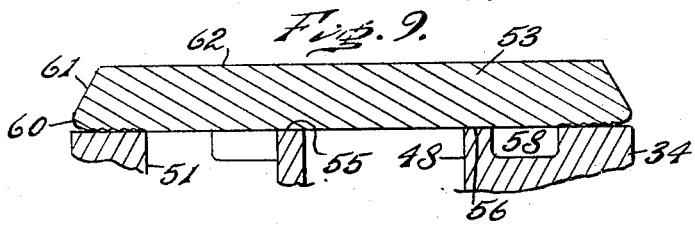
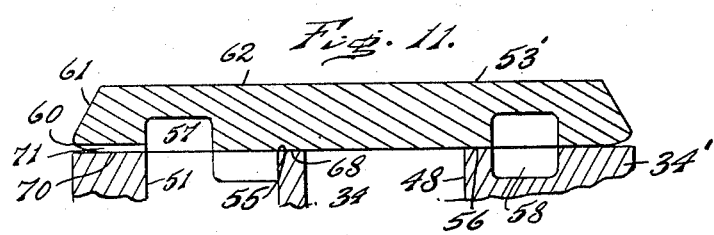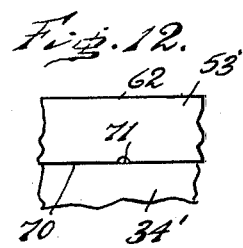
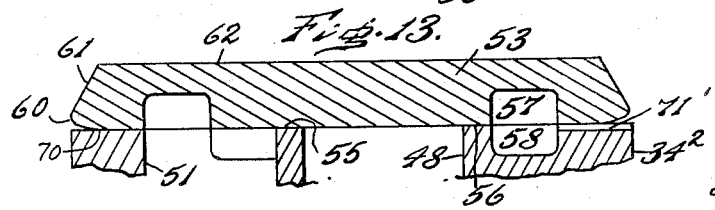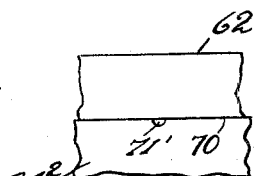
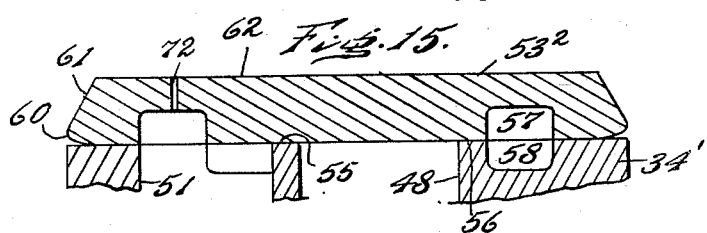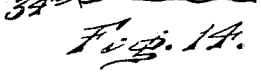
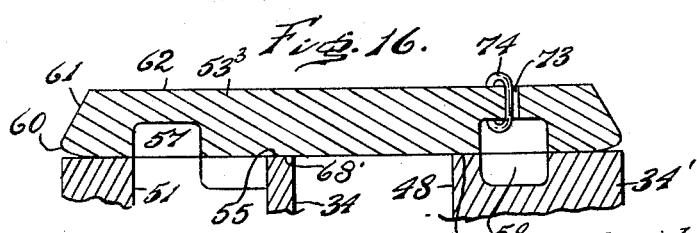

INVENTORS:
David Robert Yarnall
Walter J. Kinderman
BY
ATTORNEYS.

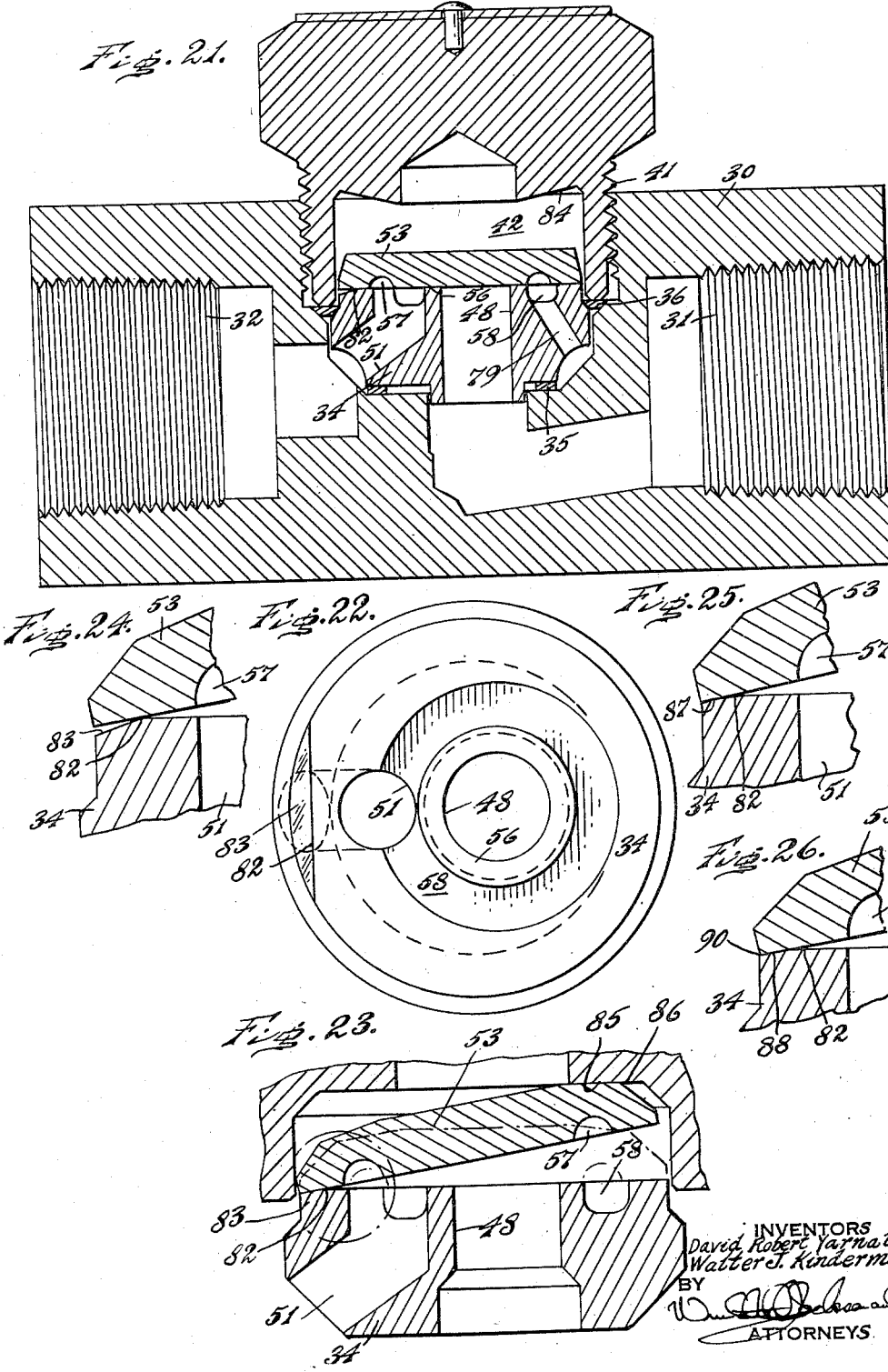

United States Patent Office 2,951,496
Patented Sept. 6, 1960

2,951,496

STEAM TRAP

David Robert Yarnall and Walter J. Kinderman, Philadelphia, Pa., assignors to Yarnall-Waring Company, Philadelphia, Pa., a corporation of Pennsylvania Filed Feb. 11, 1958, Ser. No. 714,595

34 Claims. (Cl. 137—183)

The present invention relates to steam traps which are actuated by fluid forces to discharge water and air from a steam system.

The present application is a continuation-in-part of our copending application, Serial No. 662,222, filed May 28, 1957, for Steam Trap.

A purpose of the invention is to obtain more positive actuation of a steam trap from available forces.

A further purpose is to secure greater discharge capacity for a given size of trap.

A further purpose is to produce a steam trap which opens and closes less abruptly.

A further purpose is to flush away dirt accumulations which would interference with trap operation.

A further purpose is to make the response of a steam trap to particular fluid conditions more consistent.

A further purpose is to employ continuous leakage from the control chamber to the outlet in a steam trap when the valve is closed, and to carry leakage from the inlet when the valve is closed directly to the outlet without flowing through the control chamber.

A further purpose is to employ a flow passage from a position beyond the inlet to the outlet which is a groove in the valve seat or the valve plate, or both.

A further purpose is to increase the area under the valve which is at discharge pressure as the fulcrum is approached.

A further purpose is to use an annular flow passage which is eccentric to the inlet valve disc.

A further purpose is to make a flow passage in the valve seat concentric with the inlet passage.

A further purpose is to provide a flow passage which is a groove in the valve seat and a corresponding groove in the valve disc, the grooves coinciding at one position and diverging at other positions, the position of coincidence desirably being that remote from the fulcrum.

A further purpose is to employ a steam trap valve seat which is a removable unit seated in the body.

A further purpose is to use a circular valve plate in a circular control chamber, the valve plate being free to rotate and also tilting.

A further purpose is to employ a finish on the engaging surfaces of the valve plate and valve seat which in smoothness and flatness permits leakage clearance between the mating surfaces down to but not below 10 microinches and preferably within the range from 10 to 80 microinches.

A further purpose is to use a sealing flat portion around the inlet passage, and to provide a flow passage including a groove in the valve plate and a groove in the valve seat, the center of the inlet passage being offset from the center of the valve plate away from the fulcrum by a distance of approximately ½ the width of each groove and each groove being approximately twice as wide as the sealing flat.

A further purpose is to provide a line fulcrum on the valve seat.

A further purpose is to provide a rolling fulcrum merging tangent to a line fulcrum on the valve seat.

A further purpose is to employ a rectangular valve plate.

A further purpose is to use a steam trap valve plate which has a circular recess which engages a circular shoulder forming the fulcrum surface.

A further purpose is to mount a guiding knob on the side of the valve plate remote from the seat and to guide the knob in a guiding socket in the control chamber.

A further purpose is to provide continuous leakage from the control chamber to the outlet by a groove in the valve plate or by a groove in the valve seat.

A further purpose is to extend a passage through the valve plate from the control chamber to the outlet when the valve is open.

A further purpose is to provide a hole through the valve plate from the inlet to the control chamber when the valve plate is open, the hole being closed by the valve seat when the valve plate is closed.

A further purpose is to locate the inlet passage nearer the center of a circular control chamber than the outlet passage, the center of the inlet passage being on the opposite side of the center of the valve plate from the outlet passage.

Further purposes appear in the specification and in the claims.

In the drawings we have chosen to illustrate a few only of the numerous embodiments in which our invention may appear, selecting the forms shown from the standpoints of convenience in illustration, satisfactory operation and clear demonstration of the principles involved.

Figure 1 is a central axial section through a preferred embodiment of the steam trap of the invention, the valve plate being seated.

Figure 2 is a plan view of the steam trap of Figure 1 with the bonnet and valve plate removed.

Figure 5 is a diagrammatic plan view of the steam trap of Figure 1, illustrating certain dimensional relations which are useful in explaining the operation.

Figure 6 is a fragmentary diagrammatic plan view of the steam trap of Figure 1 showing the relations of the flow passage to the remaining parts.

Figure 7 is a fragmentary axial section showing the preferred dimensions of the valve plate and groove according to the present invention.

Figure 8 is a view similar to Figure 7 showing the flow passage only in the valve plate.

Figure 9 is a view similar to Figure 7 showing the flow passage only in the valve seat.

Figure 11 is a fragmentary enlarged axial section of a modified form of valve plate with an outlet leakage groove from the control chamber to the outlet extending through the valve plate.

Figure 12 is a fragmentary elevation of the outlet leakage groove in Figure 11.

Figure 13 is a view similar to Figure 11 showing a further variation, having the leakage passage from the control chamber to the outlet through the valve seat.

Figure 14 is a fragmentary elevation showing the outlet leakage groove of Figure 13.

Figure 15 is a view similar to Figure 11 showing a leakage hole provided from the control chamber to the outlet.

Figure 16 is a view similar to Figure 15 showing a further variation in which a leakage hole is provided from the control chamber to the inlet leakage passage and thus to the outlet.

Figure 21 is a diagrammatic axial section of a variant steam trap according to the invention in seated position.

Figure 22 is a detail plan view of the valve seat shown in Figure 21.

Figure 23 is a fragmentary section similar to Figure 21, showing the valve plate in open position, but modified to show a different form of engagement with the bonnet from that which results in Figure 21.

Figure 24 is an enlarged fragment of the portion included within the circle in Figure 23.

Figures 25 and 26 are views similar to Figure 24 but showing further modifications.

Figure 3:
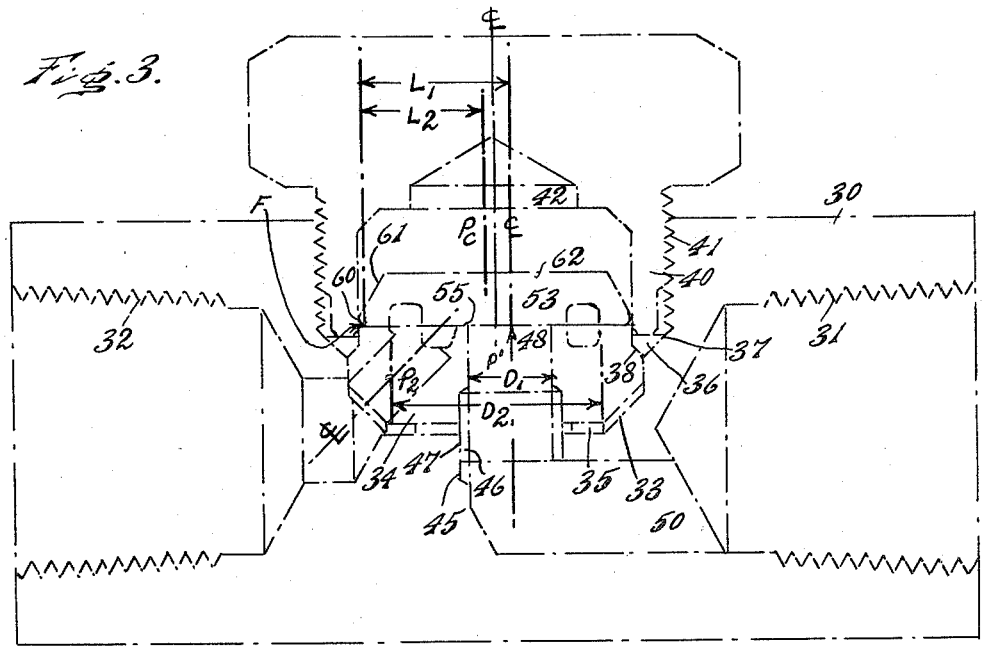
Figure 3 is a phantom view similar to Figure 1 illustrating dimensional relations which are important in explaining the operation.

Describing in illustration but not in limitation and referring to the drawings:

Steam traps of the character in which the forces incident to flow of the fluid directly cause opening and closing are well known in the art, as shown in McKee U.S. Patents 2,051,732; 2,127,649; 2,328,986; 2,622,886; 2,724,399.

The present invention is concerned with improvements in steam traps which offer a number of distinct advantages in the art.

The steam trap of the present invention is extremely light and relatively inexpensive for its large discharge capacity. The requirements for precise machining are greatly reduced, and a relatively few simple parts make up the device.

The closing forces are relatively very high, preventing the possibility that the steam trap can remain open when it should be seated.

Also in accordance with the present invention the operation of opening and closing is much smoother and less abrupt, with less likelihood of undesirable secondary effects such as noise and vibration.

The steam trap of the present invention is quite insensitive to the presence of dirt, and will tend to keep itself free from dirt accumulations as it operates.

In accordance with the invention, any leakage which occurs at the inlet valve does not result in increase in control chamber pressure, but is carried directly to the outlet through a flow passage, which may, for example, be a groove in the valve plate or in the valve seat, or in both, and which preferably constitutes a combination of a concentric circular and a circular eccentric groove, as later explained.

A further advantage of the invention is that the valve seat is readily made replaceable so that in case of wear a new valve assembly can be inserted bodily.

Continuous leakage is provided from the control chamber to the outlet, and this is suitably accomplished by providing a minimum limit of flatness and smoothness on the finish of the sealing parts, or by providing grooves or scratches or holes in one or other of the sealing parts.

In the preferred embodiment, a lever type valve plate or disc steam trap is provided consisting of a concentrically designed circular valve plate which seals an inlet passage and an outlet passage in a seat to provide for flow into and out of a chamber including the valve plate. Unlike previous practice, the inlet passage and outlet passage are eccentric with respect to the circular valve plate, and by moment forces a tilting or lever action is developed on the valve plate which pivots or rolls around a circumferential point or line at the edge of the round valve plate which is in diametral line with the center of the inlet passage and the outlet passage. This is completely different from those steam traps of the prior art in which the valve is lifted vertically without tilting.

It is important in the functioning of the steam trap of the present invention that there be leakage from the control chamber to the outlet even when the valve is closed. This is suggested by shading in various of the drawings. Unless such leakage is provided the trap becomes inoperative due to air binding.

The form of Figures 1 to 7 illustrates an embodiment of the present invention which has a body 30 consisting of any suitable metal such as stainless steel, steel, or bronze, having suitable threads 31 to connect to an inlet pipe at one end and suitable threads 32 to connect to an outlet pipe at the other end.

In the center of the body a suitably circular tapering valve seat recess 33 receives a valve seat 34 which seals in the valve seat recess by a gasket 35 in the bottom between respective bottom surfaces of the seat recess and the seat, and at an edge gasket 36 which engages in a wedge groove between a downwardly inwardly converging surface 37 of the valve seat recess and a downwardly outwardly converging wall 38 of the valve seat, the gasket 36 being tightened by the bottom edge of a hollow bonnet 40 which is threaded at 41 into the body and which forms an interior control chamber 42.

The seat has a tapered portion 43 between the two seals which is in suitably spaced relation from a corresponding portion of the seat recess and has an outer circumferential wall 44 which is in close engagement with the bore of the seat recess. The seat recess is bored at 45 and receives a sleeve 46 which is pressed or otherwise secured in a counterbore 47 in the seat which is in line with inlet passage 48 extending through the seat, preferably near the center but not at the center, as later explained.

The inlet passage and the sleeve communicate with the inlet through a bore 50 which is at least as large in cross section as the inlet passage.

The valve seat also has an outlet passage 51 which desirably extends diagonally from a position near the outer circumference of the valve seat and communicates with a bore 52 which connects with the outlet piping.

A valve plate 53, suitably of disc or plate form, rests on the flat upper surface of the valve seat, and provides a generally flat lower surface 54 which in seated position accomplishes the sealing against the valve seat. The valve has an inlet sealing portion 55 which in closed position of the valve cooperates with an inlet sealing flat 56 of ring shape on the top of the seat. These surfaces should make a reasonably good seal so as to keep leakage within bounds when the valve is seated.

Figure 4:
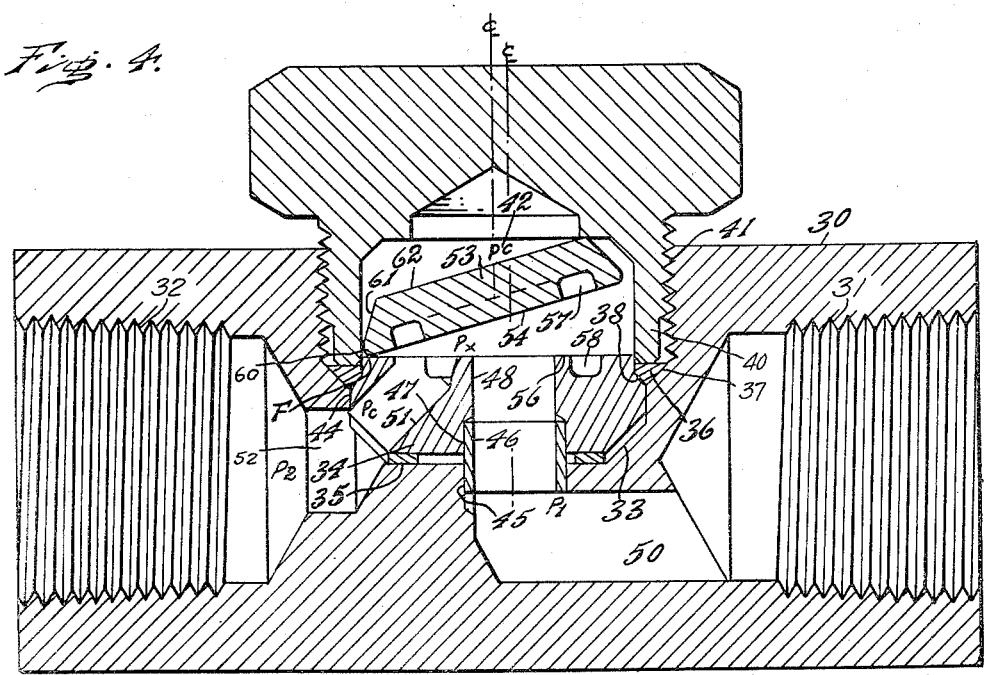
Figure 4 is a view similar to Figure 1 showing the valve plate in open position.

In the preferred embodiment there is a flow passage which communicates between the outside of a sealing area surrounding the inlet passage and the outlet, in the form of the groove 57 in the undersurface of the valve plate and the groove 58 in the valve seat, which passage surrounds the sealing area around the inlet passage and extends to the outlet. The valve plate has a suitably curved fulcrum surface 60 at its outer lower edge which permits lever action, as later explained, and the outer circumference of the valve plate tapers upward at 61 so as to provide clearance from the inside of the control chamber when the valve rocks, as shown in Figure 4. The top 62 of the valve plate is conveniently made flat in this form as shown.

The inlet passage 48 of suitably circular cross section is off center with respect to the center line of the valve plate by a distance B shown in Figure 1. This offset introduces a moment and results in lever action with fulcrum effect at F adjacent the edge 60. The inlet leakage groove 58 surrounding the sealing flat around the inlet in the seat and the inlet leakage groove 57 surrounding the inlet seat in the bottom of the disc will tend to convey any leakage from the inlet when the valve is seated through the outlet without going through the control chamber. The groove 57 is concentric with the valve plate and is in line with the groove 58 in the seat on the side of the inlet passage which is remote from the outlet passage. On the side of the inlet passage 48 which is adjacent the outlet passage or adjacent the fulcrum, the grooves 57 and 58 are offset as shown in Figure 1 by the groove width and the inner edge of the valve plate groove 57 registers with the outer diameter of the seat groove 58. It will be evident that the outlet port 51 is smaller than the inlet port and communicates with discharge.

The eccentric relations of the seat and disc grooves with respect to one another cause an increasing area under the valve plate which is at discharge passage pressure toward the fulcrum so that the center of pressure of this included area is offset slightly toward the fulcrum with respect to the center of the valve plate. This any pressure in the control chamber 42 above the valve plate will be effective at a smaller moment than the distance from the fulcrum to the center of the valve plate. This adds to the moment effect of the inlet passage eccentricity and gives a more pronounced lever action than would otherwise be possible with higher over all performance and capacity for the particular size of parts.

The numerical relations of the moment of the eccentric grooves are developed by using the distances indicated on the diagram of Figure 5.

Let $D_1$ be the inside diameter of the seat groove at distance $L_2$ and $D_2$ be the outside diameter of the valve plate at distance $L_1$ from the fulcrum F, and let $L_x$ represent the mean effective moment with respect to the pressure area A.

Then the relationship is $$\frac{\pi D_2^2 L_2}{4} - \frac{\pi D_1^2 L_1}{4} = \left[\frac{\pi D_2^2 - \pi D_1^2}{4}\right] L_x$$

and $$L_x = \frac{D_2^2 L_2 - D_1^2 L_1}{D_2^2 - D_1^2}$$

For the relations shown in Figure 1 the offset distance H equal to $L_2 - L_x$ is very close to $$\frac{B}{2}$$

thus increasing the effective moment of the inlet passage eccentricity by 50 percent.

It will be evident that the effect of the inlet passage, the size of the inlet passage, and the sizes of the grooves can all be varied to yield most effective results. If the inlet passage has a diameter equal to ⅓ of the effective valve plate diameter, the sealing contact areas and the grooves are of proportions as shown in Figures 6 and 7, where the fractions are fractions of the unit chosen for the diameter.

The steam trap of the form of Figures 1 to 7 operates in a cyclic manner, with a time interval largely controlled by the rate of leakage from the control chamber 42 to the outlet when the valve plate is closed. The trap action is largely facilitated by establishing pressure flow relations on condensate which will prevent valve reclosing, thus permitting continuous discharge until a gaseous phase such as steam or air closes the valve. If steam closes the valve, condensation of this steam over a period of time can permit reopening in the absence of leakage. If, however, cold air closes the valve, in the absence of leakage this will prevent further cycling and it is for this reason particularly that provision for leakage from the control chamber to the outlet is essential.

The operation will be understood by reference to Figure 1. Condensate flowing through the eccentrically located inlet passage 48 exerts pressure on the contacting valve plate area causing the valve plate to be elevated as shown in Figure 4. The eccentricity of the inlet passage favors tilting rather than vertical lifting of the valve plate with a fulcrum at F. Condensate is deflected by the bottom of the disc as shown in Figure 4 and is flows radially outward with a part entering the grooves 57 and 58 and with velocity effects which extend to the outer edge of the valve plate where the condensate impinges on the control chamber wall.

Flow into the control chamber reaches an equilibrium condition and pressure in the control chamber rises to a value which is related to the reconversion effectiveness of the velocity head to pressure head. The diverted flow entering the inlet leakage passage grooves and part of the direct stream passing to the outlet passage, are discharged through the outlet.

Aside from the unbalance in the inlet passage flow resulting from its offset from the centerline of the valve plate, and the effect of the center of pressure area of the grooves in the valve plate and valve seat, the pressure gradient between the inlet orifice and the port opening leading to discharge, and a turning moment resulting from flow impingement upon the angularly disposed undersurface of the disc, contribute to the positive effectiveness of the lever tilting of the valve plate.

Where condensate is flowing through the steam trap, the effective pressures to lift the valve plate are maintained at levels above the control chamber pressure which is attainable and could produce reclosure, and therefore the trap remains wide open, encouraging free discharge. When gas or vapor enters the trap, however, the flow effects are such as to develop a lower pressure under the valve plate consistent with velocity reconversion to pressure above the valve plate to accomplish valve closure. Since the difference in flow properties between one gas or vapor and another is slight, the practical effects obtained when air or dry steam enters the trap are quite similar.

The conditions for opening of the valve plate from the closed position can be developed in terms of the relations indicated on Figure 3 where $P_1$ = inlet pressure p.s.i.
$D_1$ = mean inlet orifice diameter subject to pressure $P_1$
$L_1$ = moment of the pressure acting on the inlet area about fulcrum F
$P_c$ = mean pressure in the control chamber above the valve plate
$D_2$ = mean valve plate diameter subject to the control chamber pressure $P_c$.
$L_2$ = mean moment of the control chamber pressure acting about the fulcrum F against the downstream pressure $P_2$ When the valve lever is balanced with the valve ready to lift, then $$\frac{P_1 D_1^2 \pi L_1}{4} = \frac{P_c D_2^2 \pi L_2}{4} \text{(assuming } P_2 = 0\text{)} \text{ or } \frac{P_c}{P_1} = \frac{D_1^2 L_1}{D_2^2 L_2}$$

In the relations shown in Figure 3, $$\frac{D_2}{D_1} = 2.5$$

and $$L_1 = 1.2 L_2$$

Therefore for this special case $$\frac{P_c}{P_1} = \frac{1.2}{6.25} = 0.19$$

$P_c$ = approximately 19% $P_1$

These calculations are based upon area measurements to the seating surfaces with no allowance being made for leakage and pressure penetration between the seating surfaces. This difference is to some extent cancelled out by corresponding area increases acting in both directions and the actual variation does not materially affect the result.

With the valve lever or valve plate open, the chamber pressure for closure can be determined, assuming that on saturated steam flow, a mean pressure $P_x$ will be established below the valve plate as determined by the critical pressure in the restricted downstream outlet passage 51 leading to the discharge and the respective area relations of the inlet and outlet restrictions.

The inlet passage of the proportional relations shown by Figure 3 is 4/3 of the diameter of the outlet passage restriction, and with critical flow of steam the throat pressure in the outlet passage will approximate 0.56 $P_x$ where $P_x$ is the pressure head of the downstream or discharge restriction corresponding closely to the mean pressure below the valve.

If we assume flow above the critical pressure is approximately a function of $\sqrt{P}$ $$C_1 A_1 \sqrt{P_1 - P_x} = C_2 A_2 \sqrt{P_x - P_c}$$

or $$A_1^2 (P_1 - P_x) = A_2^2 (P_x - P_c)$$

or neglecting orifice coefficients $C_1$ and $C_2$ $$\frac{P_1 - P_x}{P_x - P_c} = \left[\frac{A_2}{A_1}\right]^2$$

since $$P_c = .56 P_x; \quad \frac{P_1 - P_x}{P_x - .56 P_x} = \left[\frac{A_2}{A_1}\right]^2$$

and $$P_x = \frac{P_1}{0.44 \left[\frac{A_2}{A_1}\right]^2 + 1}$$

By substituting the value of the relation shown in Figure 3, $$P_x = 0.87 P_1$$

The requirements for $P_c$ may be developed as follows:

$$P_c D_2^2 L_2 = P_x D_2^2 L_2 + D_1^2 L_1 (P_1 - P_x)$$

or $$P_c = \frac{P_x D_2^2 L_2 + D_1^2 L_1 P_1 - D_1^2 L_1 P_x}{D_2^2 L_2}$$

By substituting the value of 0.87 $P_1$ for $P_x$ and the practical relations of Figure 3, it has been found that the value of $P_c = 89.5\% P_1$, which is the approximate mean minimum chamber pressure required to close the steam trap valve plate on steam.

On actual test it has been found that if the relations are such as to require a measured chamber pressure of approximately 80 percent of the inlet pressure $P_1$ for closure and permit reopening of the valve when the chamber pressure $P_c$ drops below 20% of P, there will be quite acceptable performance. Proportions of this character are shown in Figures 1, 3 and 7.

Although the grooved valve plate and grooved seat have shown high efficiency, it is possible to operate with a groove only in the valve plate or only in the seat for the purpose of creating an inlet leakage passage, and in fact at a sacrifice of capacity and consistency of performance the device will operate without either type of groove. I illustrate in Figure 8 a steam trap having a groove 57 only in the valve plate and I show in Figure 9 a steam trap having a groove 58 only in the valve seat. Aside from the contribution which the grooves perform to the promotion of lever action, they also serve to divert condensate flow into the outlet passage 51 much more efficiently and with pronounced efficiency in discharge capacity of the trap for the restricted proportions. Test results indicate that the capacity of the outlet passage 51 is approximately double due to the presence of the grooves as compared with operations without grooves. This may be explained by the interference effects of high radial velocity with the entering flow of the fluid into the discharge passage 51 in a normal direction.

Since the steam trap is closed by the high chamber pressure developed during passage of an expanding gaseous fluid such as air or steam, it is important that there be a rate of leakage from the control chamber to the outlet passage which is consistent with periodic reopening of the valve plate to discharge accumulated condensate. If the flow of gas persists as it may with excess of air in the lines, the valve plate will again reclose for the duration of another cycle. This will occur repeatedly until condensate reaches the steam trap, in which case the condensate will be continuously discharged until a gas phase reaches the steam trap.

It will be evident that in some steam trap applications, where rapid response to changing loading conditions is of great importance, the delayed action on air elimination may be detrimental. In other cases, however, where the condensate load is very slight and fairly constant and where the start-up period is of little consequence, as in tracer line applications, a trap of this character is very satisfactory. The trap of the present invention is particularly well suited to such applications where the continuous discharge of vapor is objectionable and where it is advantageous to sub-cool the condensate somewhat before its discharge, to minimize the release of flash steam and vapor.

Although the preferred embodiment of the invention uses a replaceable seat, which can be taken out bodily and replaced when it is worn, it will of course be evident that a replaceable seat need not be used unless desired. The alloy making up the seat and valve plate will desirably be a wear resistant alloy, such as stainless steel, other corrosion resisting steel, or bronze. The bonnet, although less important from a wear standpoint, will likewise also be made of stainless steel, steel or bronze in the preferred embodiment.

The valve plate and seat are most desirably made from type 420 heat treated stainless steel (Rockwell C45) with the seating surfaces ground to proper finish. The body and the bonnet are most desirably made of type 416 stainless steel. For higher temperatures it may be desirable to use heat treated type 440 stainless steel or other high temperature alloys for the valve plate and seat. The types of stainless steels mentioned are of course AISI types, and the specific composition limits involved are shown for example in the 1954 Supplement of the 1948 edition of "Metals Handbook," published by The American Society for Metals, page 34, Table I of that Supplement. As shown therein, type 416 stainless steel is a straight chromium stainless steel which has 12 to 14 percent chromium and a minimum of 0.07 percent phosphorus or selenium, with carbon 0.15 percent max, manganese 1.25 percent max, silicon 1 percent max and zirconium or selenium 0.60 percent max. As likewise indicated type 420 is a straight chromium stainless steel with 12 to 14 percent chromium and a minimum of 0.15 percent carbon, in which manganese and silicon are each 1 percent max, phosphorus 0.040 percent max, and sulfur 0.030 percent max. Likewise type 440 is a straight chromium stainless steel with chromium from 16 to 18 percent, carbon anywhere from 0.60 to 1.20 percent depending upon which of three grades (440A, 440B and 440C) it is, manganese and silicon each 1 percent max, molybdenum 0.75 percent max, phosphorus 0.040 percent max, and sulfur 0.030 max.

Figure 10:
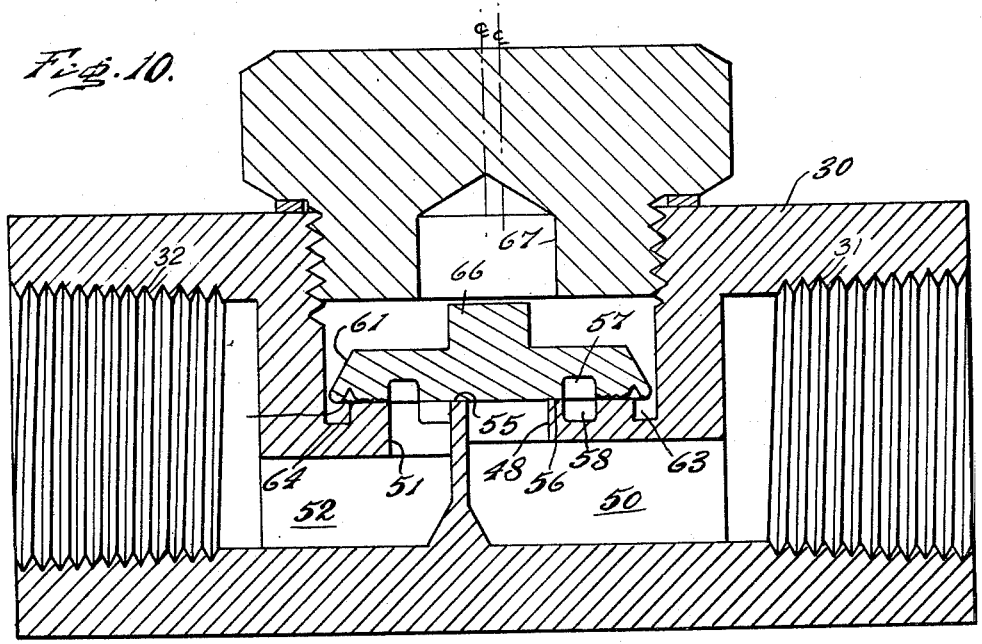
Figure 10 is a view similar to Figure 1 showing a variation with a guiding knob provided on the valve and a groove in the valve plate at the fulcrum.

Figure 10 illustrates a variation in the device of the invention. In this form the valve seat has its sealing surfaces slightly raised above the lowermost portion of the control chamber, providing an annular groove 63 and an annular fulcrum shoulder 64 around the outer edge of the seat a short distance in from the side of the control chamber. In addition to the flow groove 57 already described, the valve has cooperating with the shoulder 64 an annular fulcrum groove 65 which rides over the shoulder permitting the valve plate to fulcrum where the fulcrum groove engages the shoulder. A form similar to Figure 10, but without the fulcrum groove 65, has also been tested and is operative. In this case the outer edge of the seating surface of the seat serves as the fulcrum.

In all of the forms of the invention using a circular valve plate and circular control chamber, it will be evident that the valve is free to turn, and this distributes wear at the fulcrum. This is particularly effective in the form of Figure 10.

I also provide in Figure 10 a central upwardly extending knob 66 which in raised position of the valve loosely fits in a somewhat larger guiding socket 67 on the bottom of the bonnet and tends to keep the valve better centered when it is open. It also provides for convenient pickup and removal of the valve when servicing is required.

Leakage from the control chamber to the outlet passage to insure continuity of operation may be controlled by regulating the grinding practice used to finish the valve plate and the valve seating surfaces. These surfaces should have a smoothness and flatness on the mating seat and valve plate surfaces which on engagement will provide for noncontacting leakage clearance up to 10 microinches minimum and preferably in the range of between 10 and 80 microinches, unless some other leakage means is provided. Experimentally it has been found that such a finish can be obtained on a machine such as a Blanchard Surface Grinder with grinding speeds and feeds selected in accordance with the specific material of construction. The specific finish largely determines the cycle. For an average steam trapping application, a cycle of 45 seconds on dry steam as measured at 100 p.s.i. initial pressure gives good results. Some control of cycle time can also be exerted by increasing the control chamber size by using a bonnet with more or less hollow space. If this feature is carried to excess, however, it delays closing on steam and may be objectionable.

The machining finish at the valve contact 70 from the control chamber to the outlet (or the groove 71 if a groove is used) should allow sufficient leakage so that in service the pressure in the control chamber drops from 80 percent of line pressure to 20 percent of line pressure in from 30 to 150 seconds, and preferably in from 30 to 60 seconds.

The fit at 55 around the inlet may be a ground tight fit, but permissibly it may be the same as the machining finish in the surface between the control chamber and the outlet (for example at 70).

When the outlet sealing surfaces of the valve plate and the valve seat mate with a substantially leak-tight joint, as when they are ground in together or lapped together, it is necessary to provide another leakage means in order that this steam trap may operate satisfactorily.

Figures 11 and 12 show a valve seat 34', and a valve plate 53' which have an accurately mating inlet sealing surface 68, an outlet sealing surface 70, and a leakage groove or passage 71 has been provided extending radially on the under surface of the valve plate which permits controlled slight leakage from the control chamber to the outlet passage 51.

Figures 13 and 14 show a form somewhat similar to that of Figures 11 and 12, except that the leakage groove or channel is provided at 71' in the outlet seal surface 70 of the valve seat 34$^2$.

Figure 15 shows a variant in which a leakage hole 72 is provided through the valve plate 53$^2$ from the control chamber to the outlet passage.

As it is difficult to drill a hole fine enough to provide proper leakage from the control chamber to the outlet passage even when the valve plate is closed, it is preferable as shown in Figure 16, to drill a larger hole as shown at 73 between the opposite sides of the valve plate 53$^3$ in line with the groove 57 and almost completely fill it with a wire 74 leaving the desired clearance for leakage.

Figure 17:
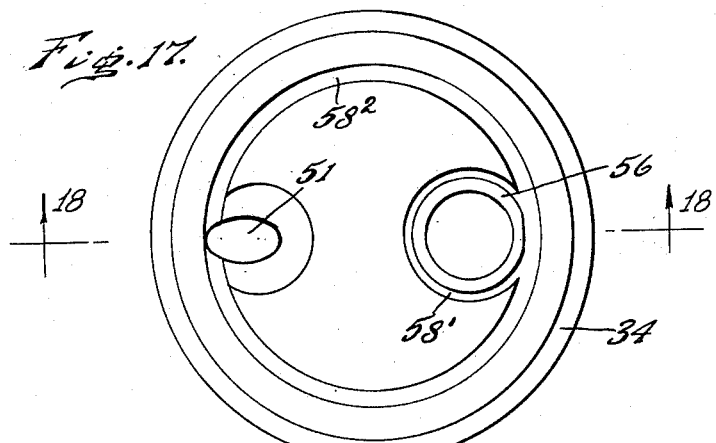
Figure 17 is a fragmentary plan view of a further modification showing a seat arrangement for a valve plate having a hole through the valve plate closed by the valve seat in seated position (Figure 18), but open from the inlet to the control chamber when the valve is open.
Figure 18:
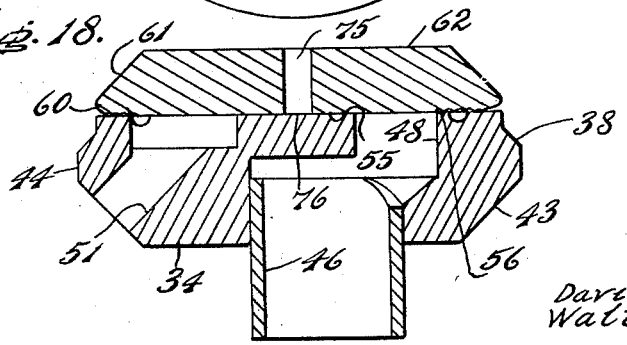
Figure 18 is a section on the line 18—18 of Figure 17, showing the valve plate and seat.

Figures 17 and 18 show steam trap parts with pressure communication between the control chamber and the flow stream provided at 75 when the valve plate is open before the stream reaches the outlet passage. When the valve plate closes, however, a valve seat portion 76 closes the passage 75 so that this communication to the control chamber is no longer necessary.

This form of Figures 17 and 18 locates the perforation 75 between the two sides of the valve plate at a point between the inlet passage and the outlet passage and provides improved communication to control chamber pressure in addition to the relatively limited communication around the edges of the valve plate when the plate is raised to discharge position.

In this form grooves 58' and 58$^2$ make the inlet leakage passage around the inlet sealing flat to the outlet.

Good results have been obtained with a steam trap of this kind.

Figure 19:
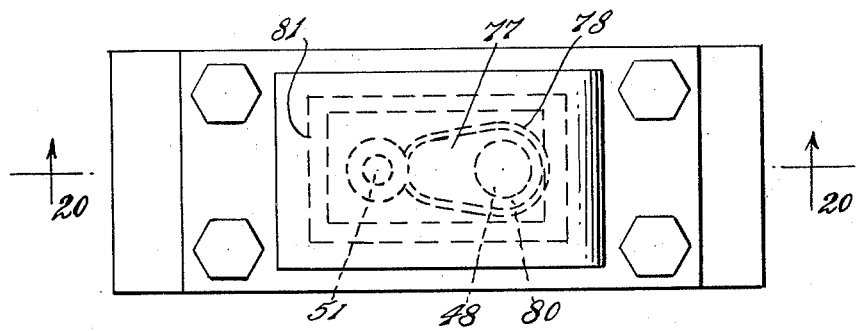
Figure 19 is a plan view of a modified form of steam trap according to the invention, in which the control chamber and valve plate are rectangular.
Figure 20:
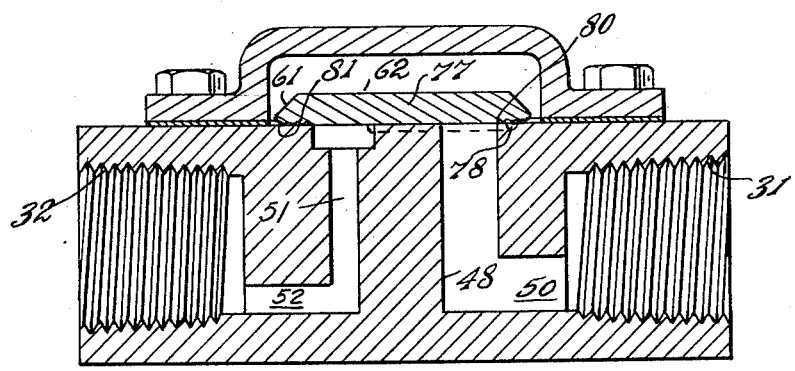
Figure 20 is a section on the line 20—20 of Figure 19.

Figures 19 and 20 show an alternate form of the steam trap of the invention where the valve plate 77 is rectangular rather than circular. Although the circular plate has many advantages from the standpoint of free turning and distribution of wear at the fulcrum, other types of valve plates can be used. In this form the inlet leakage passage comprises an oval groove 78 in the seat which extends from a space around the inlet sealing flat 80 to the outlet.

It will be evident that in a steam trap of the prior art where communication can be established between the inlet and the control chamber without direct communication with the outlet, leakage from the inlet into the control chamber will cause the steam trap to remain closed, although operating conditions would make it desirable that the steam trap open. This feature is prevented by the inlet leakage groove 78 in the form of Figures 19 and 20 and by the other inlet leakage grooves shown, so that any leakage from the inlet goes to the outlet rather than to the control chamber and it cannot build up pressure which might prevent valve opening.

One advantage of the rectangular plate form resides in the comparatively long straight line rolling fulcrum contact provide at 81 with the fulcrum surface of the seat and control chamber. This is to be compared with the very narrow contact developed at the fulcrum in the case of a round valve plate in the form of Figures 1 to 7. This long fulcrum contact tends to offset the disadvantage of continued contact at the same surfaces as compared with changing contact on the circular valve plate.

We illustrate in the form of Figures 21 to 24 a modified steam trap construction in which the valve seat at the fulcrum position is machined off and forms a fulcrum line 82 which is transverse to the line of centers of the inlet and outlet passages and adjoining and beyond the outlet passage. In this form inlet tube 46 and its counterbore have been eliminated and a drainage bore 79, is provided from the space between the packings to the inlet leakage passage 58.

In this form the valve plate 53 in its upper limiting position where it engages the top of the control chamber does not permit the tapering surface 83 beyond the line fulcrum 82 to be engaged and the valve never changes fulcrum as it opens, although of course the valve plate being circular rotates and changes its engagement with the line fulcrum.

The limiting engagement which holds the valve plate steady in open position may be provided by a dished portion 84 on the inside of the bonnet which makes flat engagement with the flat top of the valve plate in Figure 21 or by a slightly tapering surface 85 at the upper portion of the valve plate which engages a flat portion 86 of the bonnet in Figure 23.

There are several advantages in using a line fulcrum, which may be stated as follows:

(1) The fulcrum relation is confined to the seat where it can be accurately positioned with respect to the inlet and outlet openings, and therefore the device can be designed for stable operation.

(2) The line fulcrum tends to support the valve plate laterally and prevents wobbling motion of the valve plate when open, thus giving smooth and uniform discharge.

(3) Incorporation of all operating relationships in the valve seat permits the valve plate to move more freely with respect to the valve seat without influencing performance and this therefore permits wider clearances between the valve plate and the inside of the bonnet. This tends to reduce the cost of production of the valve plate and makes the device less sensitive to interference by dirt particles in the fluid stream.

The engagement of the valve in open position at flat mating surfaces with the interior of the bonnet makes the valve more stable when it is open, reduces wear and prevents stress concentration and possible damage to the valve plate due to impact.

As previously explained in the McKee patents above referred to, there are operating advantages in lengthening the lever arm as the valve opens. There is the further advantage in the present invention that this feature tends to reduce the amount of wear greatly.

Figure 25 is a modification of the form shown in Figures 21 to 24 in that the line fulcrum 82 is tangent to and merges in a curve 87 beyond the line fulcrum which takes over the fulcrum function as the valve opens. In some cases this auxiliary fulcrum action can be produced more simply as shown in Figure 26 by providing a flat portion 88 beyond the line fulcrum 82 which engages the bottom of the valve plate as the valve opens and shifts the fulcrum to a remote position 90. This gives two fulcrum steps rather than an infinite number of fulcrum steps as in the form of Figure 25.

It will be evident that the steam trap of the invention has a number of very definite advantages.

The lever action causes smooth valve opening and closing. The mechanical advantage of the lever adds to the valve responding force and extends the time factor of the response, eliminating the extreme abruptness of the discharge which occurs in some steam traps and minimizing the possibility that water hammer or other vibration or noise effects may result.

The lever action in the present invention causes relatively larger valve lift at the inlet passage located near the outer end of the lever with smaller lift at the outlet passage located near the fulcrum. This produces an increase in the intermediate pressure between the inlet and outlet passage over that of a vertical valve lift and produces compensating effect for flow conditions favorable to valve reclosure. In other words it minimizes valve sticking and steam blow.

The lever action of the valve plate of the invention results in having a larger area of communication with the control chamber at the end of the lever near the inlet orifice and a decreased communication around the valve plate as the fulcrum is approached. This causes a number of desirable effects:

(1) Circulation of flow above the valve plate occurs with flushing away of dirt particle accumulations.

(2) A greater pressure restoration occurs from kinetic energy of flow near the end of the tilting lever valve plate where the moment effect is a maximum, thus assisting in reclosing.

(3) A pressure gradient exists between the control chamber space above the valve plate with a pressure drop toward the fulcrum. This stabilizes lever movement and adds to the closing moment in proper relation to the valve opening force.

(4) The reaction of the inlet flow against the sloping surface of the valve plate in open position as determined by the lever movement causes lateral displacement toward the fulcrum. This reduces friction to a minimum since mechanical contact is largely limited to very small retardation moments. Thus sensitive response and reclosure are assured.

While the steam trap of the invention will operate without the need for the groove in the seat or the groove in the valve plate or in both, these grooves establish communicating relief areas between the valve plate and the valve seat, which are very advantageous for the following reasons:

(1) Dirt accumulations have less effect on the operation in proportion to the reduced seat contact area.

(2) The pressure relations for opening and closing are more positive and more consistent.

(3) Grinding of the seat and of the valve plate is facilitated and tolerances are less critical than where an entire continuous flat surface is used.

(4) Warpage in heat treatment and in grinding are reduced.

(5) The capacity for a given inlet and outlet passage area combination is increased. The explanation for this seems to be that where no grooves are used the outward surface velocity of flow after impingement of the fluid on the flat valve plate tends to disrupt the flow in the normal direction toward the outlet passage, thus causing a very low coefficient. The intercommunicating circumferential grooves in the seat and the valve plate serve to channel a portion of the radial flow into the grooves all around the circumferential path where the diverted flow is shielded from adverse velocity effects and cumulatively serves to feed the outlet passage at an approach to the normal coefficient.

In order to obtain best results, the fulcrum, for example, in the form of Figures 1 to 7, has a fillet which in a 13/16 inch valve plate diameter, is preferably of the order of a quarter inch radius. In any case the fulcrum radius on the edge should not be less than 1/32 inch so as to develop a rolling effect. This rolling fulcrum has the following advantages:

(1) It distributes wear over an area rather than a long line and thus gives longer life.

(2) By rotation the valve plate has a continuously changing fulcrum bearing area which further reduces wear and increases life.

(3) By rolling action rather than knife edge pivoting the mechanical advantage is slightly increased with valve life which contributes to reclosing. This is shown at 60' in Figure 7.

(4) The wear on the side is distributed over an area, thus minimizing wear and adding to longer life. This is important in view of the area of fulcrum action on the seat. Since the seat is flat and well supported, it will stand extended wear from the area of rolling engagement.

The required size of the valve plate and seat for a given capacity is greatly reduced by reason of the advantages of the lever action, the recessed seat and valve, and the rolling fulcrum. The greater mechanical advantage produces a more favorable valve control relation between open full flow and closed arrested flow positions of the valve. The inlet and outlet orifice can be relatively larger than would be permissible if a concentric inlet port were used. This offers the following advantages:

(1) The design is smaller and more compact.

(2) The provision for interchangeability of the seat and the valve plate occurs with normal proportions of trap design.

(3) Lower installation costs are incurred because of a similar lighter construction.

(4) Less material is required.

The interchangeable seat and disc construction offer the following advantages:

(1) There is a simpler replacement of the seat and valve plate without changing the piping.

(2) Maintenance cost is reduced.

(3) Minimum time is lost due to shut-down of equipment to service the steam trap.

The lever action of the rolling fulcrum valve plate permits operation in a vertical position with the valve plate on the lower side rather than the top. This permits gravity drainage with protection against freeze-up without introducing friction or causing valve retardation.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claim.

Having thus described our invention what we claim as new and desire to secure by Letters Patent is:

1. In a steam trap, a body having walls forming a control chamber having a plurality of different sides joined together at the edges thereof, a fulcrum surface in the chamber and adjoining one such edge, walls forming an inlet passage of relatively large cross sectional area at one of the sides of the control chamber at a location relatively remote from the fulcrum surface, walls forming an outlet passage of relatively smaller cross sectional area entering the said one side of the control chamber at a location spaced from the inlet passage, a valve plate freely tiltable in the control chamber, rocking about the fulcrum surface, the centroid of the cross-sectional area of said inlet passage being farther away from the fulcrum than the centroid of the area of said valve plate, said valve plate having a seated position in which the inlet passage is at least nearly closed and the portion of the control chamber on the side of the valve plate remote from the inlet and outlet passages is nearly closed off from the outlet, and having an open position in which the inlet passage and the outlet passage communicate through the control chamber and with the portion of the control chamber on the side of the valve plate remote from the inlet and outlet passages, a first valve seat means cooperating with the valve plate in seated position of the valve plate to at least greatly reduce flow from the inlet passage to the control chamber and to the outlet passage, means including the valve plate and outlet passage and the interrelation thereof, whereby any leakage from the inlet passage when the valve plate is seated flows directly to the outlet passage without flowing through the portion of the control chamber on the side of the valve plate remote from the inlet and outlet passages, and a second valve seat means cooperating with the valve plate in seated position of the valve plate to restrict flow from the portion of the control chamber remote from the inlet and outlet passages to the outlet passage, there being continuous leakage means between the portion of the control chamber remote from the inlet and outlet passages and the outlet even when the valve plate is seated.

2. A steam trap of claim 1, having a flow passage around the inlet which communicates with the outlet passage in open and in seated position of the valve plate.

3. A steam trap of claim 2, in which the flow passage comprises a groove in the valve plate.

4. A steam trap of claim 2, in which the flow passage comprises a groove in the valve seat means.

5. A steam trap of claim 2, in which the flow passage is a groove in the valve plate and also a groove in the valve seat means.

6. A steam trap of claim 2, in which the area beneath the valve plate which is in communication with the outlet increases as the outlet is approached.

7. A steam trap of claim 2, in which the flow passage comprises a passage which is annular but eccentric to the inlet passage.

8. A steam trap of claim 2, in which the flow passage comprises a passage which is in the seat and concentric with the inlet passage.

9. A steam trap of claim 2, in which the flow passage is a groove in the valve plate and a groove in the valve seat means, said grooves coinciding at one position and diverging at the other positions.

10. A steam trap of claim 9, in which the grooves coincide at a position remote from the fulcrum and diverge closer to the fulcrum.

11. A steam trap of claim 2, in which the control chamber is circular and the valve plate is circular and free to turn therein, the flow passage includes a groove in the valve plate and a groove in the valve seat means, and the valve seat means includes a sealing flat around the inlet passage, the grooves being each twice as wide as the sealing flat, and the center of the inlet passage being offset from the center of the valve plate away from the fulcrum a distance equal to one-half the groove width.

12. A steam trap of claim 1, in which the valve seat means comprises a removable unit inserted in the body.

13. A steam trap of claim 1, having on the edge of the valve plate which engages the fulcrum surface, a curved surface on a radius not less than 1/32 inch.

14. A steam trap of claim 1, in which the control chamber is circular and the valve plate is circular and free to turn.

15. A steam trap of claim 1, having a smoothness and flatness on the mating seat and valve plate surfaces which on engagement will provide for noncontacting leakage clearance up to 10 microinches minimum.

16. A steam trap of claim 15, in which the leakage clearance is in the range of between 10 and 80 microinches.

17. A steam trap of claim 1, in which the valve plate is rectangular.

18. A steam trap of claim 1, in which the valve plate is circular, the fulcrum surface comprises a circular shoulder, and the valve plate has a circular recess which engages the circular shoulder.

19. A steam trap of claim 1, in combination with a guiding knob on the side of the valve plate remote from the seat, and a guiding socket in the control chamber engaging the knob in open position of the valve plate.

20. A steam trap of claim 1, in which there is a groove in the valve plate which provides the continuous leakage means from the control chamber to the outlet passage when the valve plate is closed.

21. A steam trap of claim 1, in which there is a groove in the valve seat means which provides the continuous leakage means from the control chamber to the outlet passage when the valve plate is closed.

22. A steam trap of claim 1, in which there is a hole through the valve plate open from the control chamber to the outlet passage when the valve plate is closed.

23. A steam trap of claim 1, in which there is a hole through the valve plate open from the inlet to the control chamber when the valve plate is open, said hole being closed by the valve seat means when the valve plate is closed.

24. A steam trap of claim 1, in which the fulcrum surface extends along a line fulcrum.

25. A steam trap of claim 24, in which there is an auxiliary fulcrum surface merging with the line fulcrum and making fulcrum engagement when the valve lifts.

26. A steam trap of claim 25, in which the auxiliary fulcrum surface is curved.

27. A steam trap of claim 25, in which the auxiliary fulcrum surface is flat.

28. A steam trap of claim 1, in which the top surface of the control chamber makes flat engagement against the valve plate in open position.

29. A steam trap of claim 1, in which the leakage from the control chamber to the outlet permits the control chamber pressure to drop from 80 percent of line pressure to 20 percent of line pressure in from 30 to 150 seconds.

30. In a steam trap, a body having a circular control chamber, a circular valve plate in the control chamber, an inlet passage into the control chamber extending to one side of the valve plate in closed position eccentric with respect to the control chamber, inlet valve seat means sealing against the valve plate around the inlet passage in seated position, an outlet passage into the control chamber extending from the one side of the valve plate in closed position, outlet valve seat means restricting flow from the control chamber into the outlet passage when the valve plate is seated while permitting continuous leakage, a fulcrum surface at said one side of the control chamber at a position remote from the inlet passage, said valve plate being free to tilt with one edge resting on said fulcrum surface, and a flow passage extending from the space around the inlet valve seat directly to the outlet passage when the valve plate is closed.

31. A steam trap of claim 30 in which the inlet passage is nearer the center of the control chamber than the outlet passage but the center of the inlet passage is on the opposite side of the center of the valve plate from the outlet passage.

32. In a steam trap, a body having a circular control chamber, a circular valve plate in the control chamber, an inlet passage into the control chamber extending to one side of the valve plate in closed position, inlet valve seat means sealing against the valve plate around the inlet passage in seated position, an outlet passage into the control chamber extending from the one side of the valve plate in closed position, outlet valve seat means restricting flow from the control chamber into the outlet passage when the valve plate is seated while permitting continuous leakage, the inlet passage being nearer the center of the control chamber than the outlet passage but the center of the inlet passage being on the opposite side of the center of the valve plate from the outlet passage, and a fulcrum surface in the control chamber engaging said one side of the valve plate at a point remote from the inlet passage, said valve plate being free to tilt in the control chamber about said fulcrum surface.

33. A steam trap comprising walls forming a chamber for fluid under pressure, said chamber having an imperforate top and imperforate sides having a cross section which is circular about a particular vertical axis as a center, and said chamber having a bottom which has walls forming an inlet opening eccentric of said axis, walls forming outlet opening means, a fulcrum surface including a point on a line running from the center of the inlet opening through the axis and located on the opposite side of the axis from the center of the inlet opening and an annular groove surrounding and concentric with the inlet opening; an imperforate circular disk having on the underside thereof an annular groove having a radius equal to the greatest distance between the chamber axis and the annular groove on the bottom of the chamber, the center of the inlet passage being farther away from said fulcrum surface than the center of said circular disc; the circular disk having two positions, a flat bottom position and a second position in which it is inclined with the bottommost end fulcruming on the fulcrum surface, and having mating surfaces on the bottom of the disk which in the bottom position of the disk mate with the bottom of the chamber respecively in the one case completely around the inlet opening inside of the grooves and outlet opening, and in the other case completely around all said grooves and the inlet opening and outlet opening means as a group, except that there are leakage means in said bottom position of the disk at least between the inlet opening and the part of the chamber which is above the disk, and the said grooves being in communication with the outlet opening in said bottom position of the disk, and the disk being freely shiftable rotationally around its center to an unlimited extent, subject only to the friction of fulcrum and mating surfaces.

34. In a steam trap, a housing having a control chamber, said housing including a flat disc seat plate which forms one wall of the control chamber, a flat disc valve in the control chamber resting on said seat plate, the valve being permitted to tilt freely in the control chamber, inlet port means in the seat plate located off center with respect to the valve, a discharge, a circular outlet groove in the seat plate surrounding the inlet port means and communicating with the discharge, there being sealing areas on both sides of said groove, a fulcrum surface for valve disc lift on the seat plate at a point of maximum edge remoteness from said inlet port means, and means providing slow leakage flow from the control chamber above the valve to the discharge across the outlet sealing area.

References Cited in the file of this patent

UNITED STATES PATENTS 2,724,399    McKee _____ Nov. 22, 1955

FOREIGN PATENTS 575,490    Australia _____ Feb. 20, 1946
755,178    Great Britain _____ Aug. 15, 1956